July 25, 1933.  E. G. MUNZ  1,919,246
ROTARY SPRINKLER
Filed Dec. 21, 1931   2 Sheets-Sheet 1
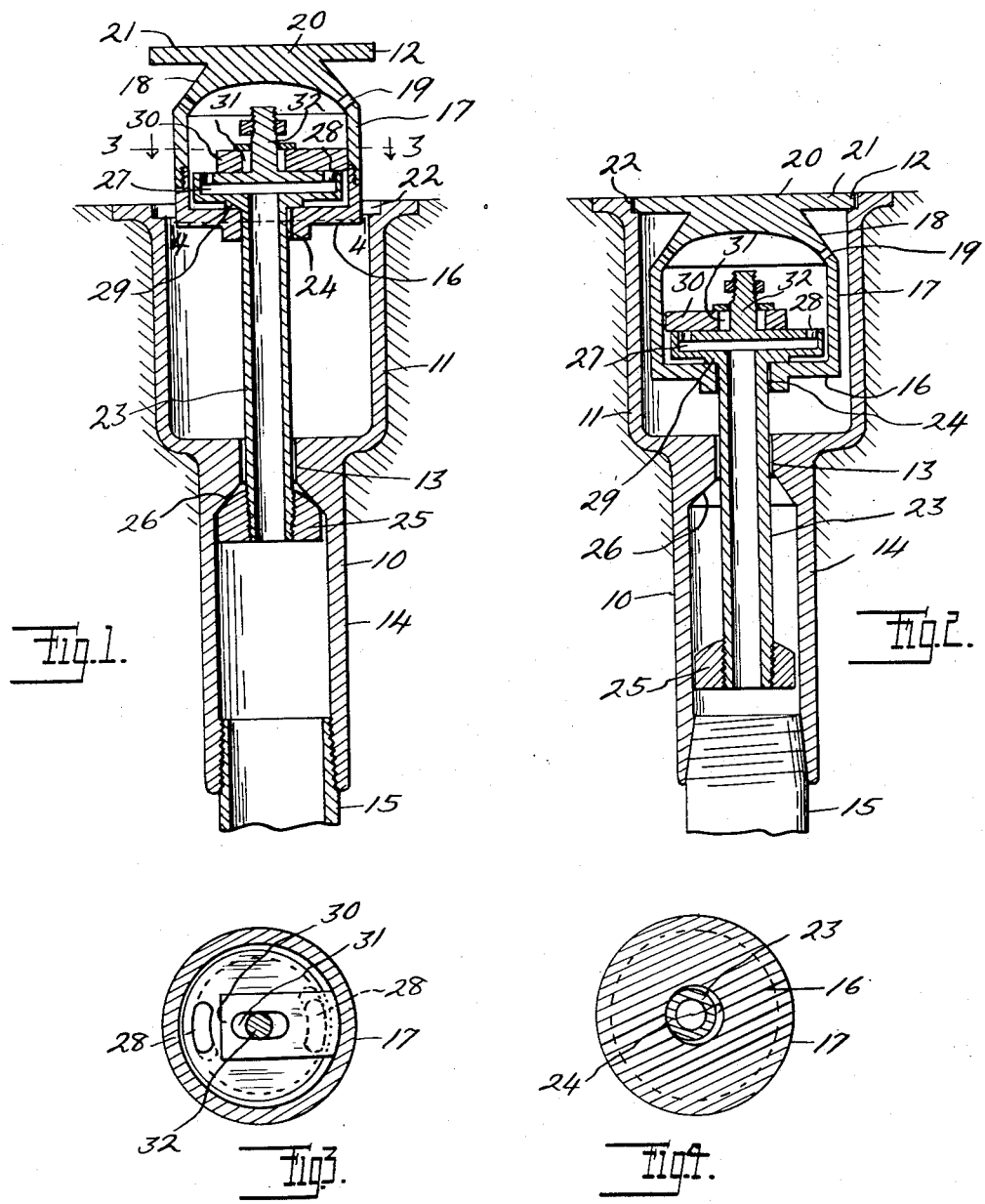
INVENTOR.
Elmer G. Munz
BY
ATTORNEYS July 25, 1933. E. G. MUNZ 1,919,246
ROTARY SPRINKLER
Filed Dec. 21, 1931 2 Sheets-Sheet 2

INVENTOR
Elmer G. Munz
BY Whittemore Hulbert
and Whittemore Belknap
ATTORNEYS

Patented July 25, 1933

1,919,246

UNITED STATES PATENT OFFICE

ELMER G. MUNZ, OF DETROIT, MICHIGAN

ROTARY SPRINKLER

Application filed December 21, 1931. Serial No. 582,458.

This invention relates generally to irrigating apparatus and refers more particularly to improvements in sprinkling devices especially designed for distributing water over relatively large areas.

The present invention concerns itself still more particularly with that type of sprinkler having a rotatable distributing head together with means associated with the head for rotating the latter at a relatively slow rate of speed irrespective of the velocity or the pressure of the water issuing from the head.

One of the principal objects of this invention resides in the novel and simple means provided herein for effecting a relatively slow rotation of the distributing head which will be made more apparent as this description proceeds, especially when considered in connection with the accompanying drawings, wherein:

Figure 1 is a longitudinal sectional view of a sprinkler constructed in accordance with this invention;

Figure 2 is a sectional view similar to Figure 1 showing the distributing head of the sprinkler in its inoperative position;

Figure 3 is a cross sectional view taken on the line 3—3 of Figure 1;

Figure 4 is a similar sectional view taken on the line 4—4 of Figure 1;

Figure 5:
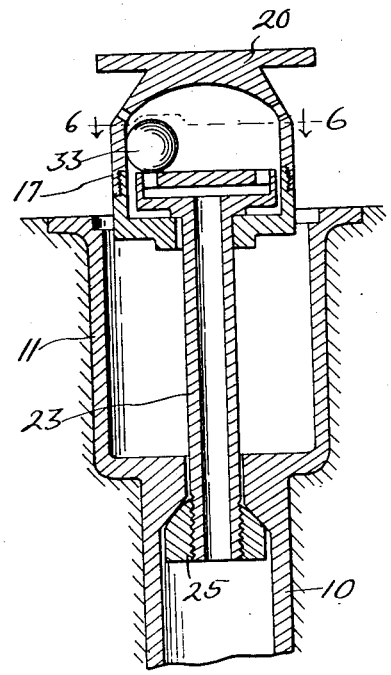
Figure 5 is a fragmentary view similar to Figure 1 showing a slightly modified form of construction.

The sprinkler shown herein for the purpose of illustrating the present invention comprises a housing 10 adapted to be permanently embedded within the ground flush with the top surface thereof and having a chamber 11 at the upper end of sufficient dimension to completely receive the water distributing head 12. The chamber 11 is open at the top so as to provide for movement of the distributing head from the position thereof shown in Figure 2 to the position of the same illustrated in Figure 1 and the bottom wall of the chamber is provided with an axially arranged restricted passage 13 therethrough establishing communication between the chamber and a tubular portion 14 extending downwardly from the housing. The tubular portion 14 of the housing in turn communicates with a source of water under pressure through the medium of a conduit 15 threadedly engaging the lower end of the tubular portion.

The distributing head 12 is preferably in the form of a casing having a circular bottom wall 16 and having annular side wall portions 17 terminating at the upper ends thereof in an inwardly extending conical wall portion 18 having apertures 19 therethrough for the passage of the water. The conical wall portions 18 merge into the top wall 20 of the head as clearly shown in Figures 1 and 2 of the drawings. The inner surface of the top wall preferably forms a continuation of the inner surfaces of the conical wall portions and cooperates with the latter to form a spherical dome for the head so as to provide for efficiently discharging the water through the apertures 19. It will further be apparent from Figures 1 and 2 that the top wall 20 of the head is provided with a circular radially outwardly extending flange 21 forming a continuation of the top wall 20 and adapted to engage within a recess 22 surrounding the opening in the housing and forming an annular seat for supporting the distributing head in its inoperative position shown in Figure 2.

For discharging water under pressure into the distributing head and for also securing the head to the housing, I provide a tubular stem 23 having the upper end extending into the head through an opening 24 in the bottom wall 16 of the head and having the lower end portion extending through the passage 13 into the tubular portion 14 of the housing. The diameter of the stem is slightly less than the diameter of the opening 13 so as to provide for the passage of water from the portion 14 of the housing to the portion 11 thereof for moving the distributing head from the position shown in Figure 2 to the position thereof illustrated in Figure 1. The lower end of the stem is provided with an enlarged head portion 25 operable in the position of the parts shown in Figure 1 to engage an annular seat 26 surrounding the lower edge of the opening 13 for restricting upward movement of the stem relative to the housing and for also preventing the escape of fluid through the passage 13 into the chamber 11 with the result that this fluid will be compelled to flow upwardly through the stem into the distributing head. The water discharged from the stem into the distributing head is given a whirling motion and this is accomplished by providing an enlarged chamber 27 upon the upper end of the stem communicating with the latter and having inclined or tangentially arranged ports 28 in the upper wall thereof through which the water is discharged into the head.

With the parts as thus far described and assuming that the distributing head is in its inoperative position shown in Figure 2 and that water under pressure is caused to flow into the lower end of the housing, it will be noted that the reaction of the water on the bottom surface of the enlargement 25 and the corresponding surfaces of the distributing head will force the latter, together with the stem 23, to their operative positions shown in Figure 1. When the distributing head and stem are in the positions thereof illustrated in Figure 1, the inner surface of the bottom wall 16 of the head engages a fixed bearing 29 formed on the stem and the enlarged head portion 25 of the stem assumes a position in engagement with the annular seat 26 causing the water to flow through the stem into the distributing head in the manner hereinbefore set forth.

As previously stated, it is one of the principal objects of the present invention to provide means for effecting a relatively slow rotation of the distributing head when the same is in the position shown in Figure 1 irrespective of the velocity or pressure of the water discharged into the head through the ports 28. For accomplishing the above result, I provide a predetermined clearance between the stem and adjacent sides of the opening 24 through the bottom wall 16 of the head so as to provide for limited shifting movement of the head in all directions transverse to the axis of the stem. In addition to the foregoing, I provide a weight 30 within the head in the form of an arm having a relatively large opening 31 through the inner end thereof for freely receiving a suitable projection 32 extending upwardly from the chamber 27 in axial alignment with the stem 23. The clearance provided between the side walls of the opening 31 and the projection 32 is such as to permit the outer end of the arm to frictionally engage the inner annular surface of the side wall 17 of the head irrespectively of the eccentricity of the latter relative to the stem. As will be observed from Figures 1 and 2, the weight 30 is located within the head above the chamber 27 so that the weight will in effect float upon the water discharged into the head from the chamber 27, and due to the whirling action of the water thus discharged, the weight 30 will be rotated around the projection by the water.

Rotation of the weight 30 by the whirling water in the head sets up a centrifugal force in the weight urging the outer end of the same into frictional contact with the inner wall of the head and as a consequence combines with the whirling water to exert a torque on the head tending to rotate the same. Rotation of the head as a unit with the weight, however, is prevented in the present instance by providing the bearing surface 29 with sufficient frictional surface area to prevent free rotation of the head by the weight and action of the water with the result that the weight will rotate relative to the head. The centrifugal force set up by the weight during its rotation functions to move the weight radially outwardly into engagement with the sides of the head and since a clearance is provided between the stem and adjacent side walls of the opening 24, the head will also be carried outwardly relative to the stem. In other words, the arrangement is such that a gyratory motion is imparted to the head by the weight causing the former to roll around the stem at a speed depending upon the differences in circumference of the opening 24 and stem 23. Thus, it will be observed that the speed of rotation of the head may be controlled by varying the circumference of either the opening 24 or the stem 23.

Figure 6:
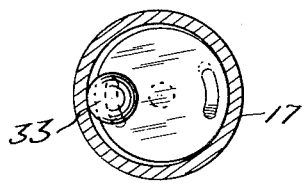
Figure 6 is a sectional view taken on the line 6—6 of Figure 5.

The construction illustrated in Figures 5 and 6 differs from the one previously described in that a ball weight 33 is substituted for the arm 30 in the above described construction. The ball 33 functions in the same manner as the arm 30 to perform the results previously described.

Figure 7:
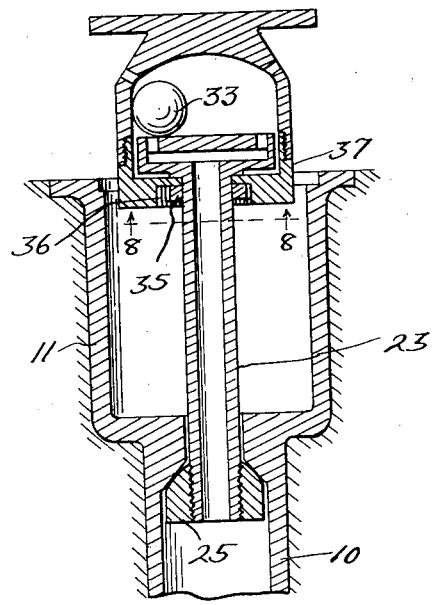
Figure 7 is a view similar to Figure 5 showing still another modified form of construction.
Figure 8:
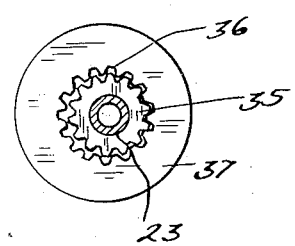
Figure 8 is a sectional view taken on the line 8—8 of Figure 7.

The modified form of the invention featured in Figures 7 and 8 of the drawings is similar to the first described form of the invention except that a gear 35 is fixed upon the non-rotatable stem 23 concentric with the latter and having teeth adapted to mesh with corresponding internal teeth 36 formed on the water distributing head 37. The pitch diameter of the gear 35 being substantially less than the corresponding diameter of the internal gear so as to provide for obtaining a gyratory movement of the head relative to the stem in the manner previously set forth. The arrangement is such that as the head 37 is gyrated or shifted transverse to the axis of the stem by the weight 38 in the head in the manner set forth in the first described form of the invention, the teeth 36 will mesh with the adjacent teeth on the fixed gear 35 and owing to the variations in pitch diameter of the two gears, the teeth 36 will roll about the gear 35. With the above construction, it will be apparent that the head will be positively advanced in one direction at a speed in dependence upon the relative pitch diameters of the external and internal gears.

What I claim as my invention is:

1. In a sprinkler, a tubular stem communicating at one end with a source of water under pressure, a water distributing head communicating with said stem for receiving water under pressure and loosely mounted upon the stem for movement in transverse directions relative to the latter, and means operable by the water discharged into said head for continuously urging said head outwardly relative to the stem in different directions causing the head to roll around the stem at a relatively slow rate of speed.

2. In a sprinkler, a rotary water distributing head formed with a bottom wall having a circular opening therethrough, means for discharging water into said head including a tubular stem extending through the opening aforesaid into the head and having an external diameter substantially less than the interior diameter of the opening in the bottom wall of the head permitting shifting movement of the latter transversely of the stem, and means operable by the water discharged into the head for continuously urging said head outwardly relative to the stem in different directions causing the circular wall of said opening to roll around the stem whereby rotation of said head is effected at a speed determined by the differences in the circumferences of the circular wall of the opening and stem.

3. In a sprinkler, a rotary water distributing head formed with a bottom wall having a circular opening therethrough, means for discharging water into said head including a tubular stem extending through the opening aforesaid into the head and having an external diameter substantially less than the interior diameter of the opening in the bottom wall of the head permitting shifting movement of the latter transversely of the stem, a weight located within the head for rotation relative to the latter by the water discharged thereinto and movable by centrifugal force into frictional engagement with the side walls of the head whereby the latter is moved outwardly in different directions relative to the stem as the weight assumes different rotative positions relative to the head and owing to the differences in the circumference of the opening and stem outward movement of the head by the weight causes the side walls of the opening to roll around the stem.

4. In a sprinkler, a rotary water distributing head formed with a bottom wall having a circular opening therethrough, means for discharging water into said head including a tubular stem extending through the opening aforesaid into the head and having an external diameter substantially less than the interior diameter of the opening in the bottom wall of the head permitting shifting movement of the latter transversely of the stem, a member within the head rotatable by the water discharged into the latter and movable by centrifugal force into engagement with the inner walls of the head tending to rotate the head as a unit therewith, and means resisting rotation of the head by said member whereby the centrifugal force set up by the latter in rotating relative to the head functions to continually shift said head outwardly in different directions relative to the stem and owing to the differences in circumference of the opening and stem the aforesaid outward movement of the head causes the side walls of the opening to roll around the stem.

5. In a sprinkler, a tubular stem communicating at one end with a source of water under pressure, a water distributing head communicating with the opposite end of said stem for receiving water under pressure and loosely mounted upon the stem for shifting movement transversely of the latter, a weight mounted within the head rotatable by the water discharged into the latter and movable by centrifugal force into frictional engagement with the inner side walls of the head tending to rotate the latter as a unit therewith, and means for resisting rotation of the head by said weight whereby the centrifugal force set up by the latter in rotating relative to the head progressively moves the head outwardly in different directions relative to the stem causing the head to roll around the stem at a slower rate of speed than the speed of rotation of the weight by the water.

6. In a sprinkler, a casing, a distributing head rotatably and axially movable with respect to said casing and having a bottom wall formed with a circular opening therethrough, means operable by water pressure for axially moving said head including a tubular stem extending into the head through the opening aforesaid and having an external diameter substantially less than the internal diameter of said opening, means associated with the stem for discharging water under pressure into the head, and means operable by the water discharged into the head for continuously urging said head outwardly relative to the stem in different directions causing the circular wall of said opening to roll around the stem whereby rotation of said head is effected at a speed determined by the differences in the circumferences of the circular wall of the opening and stem.

7. In a sprinkler, a casing, a distributing head rotatably and axially movable with respect to said casing and having a bottom wall formed with a circular opening therethrough, means operable by water pressure for axially moving said head including a tubular stem extending into the head through the opening aforesaid and having an external diameter substantially less than the internal diameter of said opening, means associated with the stem for discharging water under pressure into the head, a weight located within the head for rotation relative to the latter by the water discharged thereinto and movable by centrifugal force into frictional engagement with the side walls of the head, whereby the latter is moved outwardly in different directions relative to the stem as the weight assumes different rotative positions relative to the head and owing to the differences in the circumference of the opening and stem outward movement of the head by the weight causes the side walls of the opening to roll around the stem.

8. In a sprinkler, a rotary distributing head formed with a bottom wall having a circular opening therethrough and having gear teeth encircling said opening concentric therewith, means for discharging water under pressure into the head including a tubular non-rotatable stem of less diameter than the opening and extending therethrough, a gear fixed to the stem concentric therewith having a pitch diameter substantially less than the pitch diameter of the gear teeth on the head permitting shifting movements of the latter transversely of the stem and adapted to mesh with said gear teeth as the head is moved outwardly relative to the stem, and means operable by the water discharged into the head for continuously urging said head outwardly in different directions to cause the gear teeth on the stem to mesh with the gear teeth on the head and thereby provide for rolling the head around the stem at a rate depending upon the difference in the said pitch diameters.

9. In a sprinkler, a rotatable head, a rotor within said head operated by water entering said head, and means between said rotor and said head for continuously rotating said head at a substantially reduced speed with respect to said rotor.

10. In a sprinkler, a rotatable head, a rotor within said head operated by water entering said head, and means between said rotor and said head for rotating said head at a definitely reduced speed ratio with respect to said rotor.

ELMER G. MUNZ.